US012582575B2

(12) United States Patent
Barkholt

(10) Patent No.: US 12,582,575 B2
(45) Date of Patent: Mar. 24, 2026

(54) EYE RINSING ELEMENT

(71) Applicant: Plum Safety ApS, Assens (DK)

(72) Inventor: Bo Winther Barkholt, Glamsbjerg (DK)

(73) Assignee: Plum Safety ApS, Assens (DK)

( * ) Notice: Subject to any disclaimer, the term of this patent is extended or adjusted under 35 U.S.C. 154(b) by 379 days.

(21) Appl. No.: 18/152,023

(22) Filed: Jan. 9, 2023

(65) Prior Publication Data

US 2023/0218478 A1 Jul. 13, 2023

(51) Int. Cl.
*A61H 35/02* (2006.01)
*B05B 1/18* (2006.01)

(52) U.S. Cl.
CPC ............. *A61H 35/02* (2013.01); *B05B 1/185* (2013.01)

(58) Field of Classification Search
CPC ....... A61H 35/02; B05B 1/185; A61F 9/0026; A61F 9/0008
See application file for complete search history.

(56) References Cited

U.S. PATENT DOCUMENTS 5,754,990 A 5/1998 Gurries
D672,870 S * 12/2012 Bertelsen .............. A61F 9/0026 D24/120
9,314,398 B2 * 4/2016 Perrin ................ A61H 33/6068
10,973,737 B2 * 4/2021 Eveleigh ................ A61H 35/02
2007/0119968 A1 5/2007 Collins
2008/0255527 A1 * 10/2008 Osborne ................ A61H 35/02 604/290
2016/0095794 A1 4/2016 Eveleigh
2018/0338888 A1 * 11/2018 Stennis .................. A61H 35/02
2019/0110951 A1 * 4/2019 Eveleigh ............ A61H 33/0095

FOREIGN PATENT DOCUMENTS

CN 107753272 A * 3/2018 ............. A61H 35/02
CN 111939054 A * 11/2020 ............. A61H 35/02
DE 202009007205 U1 11/2009

OTHER PUBLICATIONS

European Intellectual Property Office, Search Report for Application No. 22150694.2, mail date Jun. 27, 2022, 7 total pages.

* cited by examiner

*Primary Examiner* — Qingzhang Zhou
(74) *Attorney, Agent, or Firm* — SoCal IP Law Group LLP; Mark Andrew Goldstein

(57) ABSTRACT

The invention relates to an eye rinsing element comprising two rinsing fluid discharge areas, wherein each discharge area comprises multiple openings for discharging rinsing fluid.

10 Claims, 2 Drawing Sheets

EYE RINSING ELEMENT

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from European Patent Application No. 22150694.2, filed Jan. 10, 2022 entitled, "EYE RINSING ELEMENT", which is incorporated herein by reference in its entirety.

DESCRIPTION

The invention relates to an eye rinsing element as well as an eye rinsing device according to the independent claims.

PRIOR ART

Eye rinsing elements are known from the prior art. These typically have an opening for each eye, from which rinsing fluid can be discharged towards the eyes. However, the stream exiting the eye rinsing elements is typically quite strong, wherein the streams exit the device at a divergence angle such that the distance from the eye to be rinsed to the eye rinsing element is of crucial importance.

DESCRIPTION OF THE INVENTION: OBJECTS, SOLUTION, ADVANTAGES

It is an objective of the present invention to improve an eye rinsing element in such a way that a rinsing process of the eyes of a user is simplified, while the process is as comfortable and effective as possible at the same time.

The above objective is solved by providing an eye rinsing element having two rinsing fluid discharge areas, wherein each area comprises multiple openings for discharging rinsing fluid. In particular, each area comprises at least 6, preferably at least 8, most preferred at least 10, openings for discharging rinsing fluid. In a most preferred embodiment, each area can comprise twelve openings. Especially preferred, each fluid discharge area covers an area of at least 1 $cm^2$, more preferred at least 2 $cm^2$, most preferred at least 3 $cm^2$.

As a result of the above, rinsing fluid is discharged over a wider area than typically known from the prior art and exits the element softer compared to typical eye rinsing elements with just one opening. Especially, the openings discharge fluid in such a way that a beam in each discharge area results which has a diameter of at least 1 mm, further preferred more than 1.1 mm, most preferred more than 1.2 mm. Compared to eye rinsing elements with only one opening per eye, the beam is thus broader and softer which makes the eye rinsing process much more comfortable while at the same time effective and safe for the user.

The openings of each rinsing fluid discharge area are preferably arranged on two concentric circles, namely an inner and an outer circle, wherein the outer circle comprises more openings that the inner circle. Both concentric circles are centered around a central point of the respective fluid discharge area. Advantageously, the outer circle comprises more, especially at least double as many, openings as the inner circle, most preferred exactly double as many openings. Especially preferred, neighboring openings of the inner circle have an angular distance of 90°, wherein neighboring openings of the outer circle have an angular distance of 45°. The openings can further be arranged on at least two concentric circles.

The openings can be formed within the eye rinsing element in a parallel way to each other as well as in a longitudinal direction of the eye rinsing element, so that rinsing fluid is discharged in both discharge areas in the longitudinal direction of the eye rinsing element. In other words, the openings run within the eye rinsing element parallel to each other in a longitudinal direction such that the streams exiting the discharge areas run parallel to each other, independent from the distance to the eye rinsing element. Preferably, each opening has a diameter between 0.1 mm and 5 mm, preferably between 0.5 mm and 1.5 mm, most preferred between 0.8 mm and 1.2 mm. The diameter can also be 1 mm.

In a first longitudinal cross section, the discharge areas form part of a curved surface, which has a radius between 3 mm and 9 mm, preferably between 5 mm and 7 mm, most preferred between 5.5 mm and 6 mm.

Further preferred, the eye rinsing element has a first end area in longitudinal direction comprising the rinsing fluid discharge areas, wherein, in the first end area, the eye rinsing element widens continuously, and preferably constantly, in the first longitudinal cross section. In the respective cross section, the surfaces of the first end area are straight and enclose an angle between 20° and 60°, preferably between 30° and 50°, most preferred around 40°.

In a second longitudinal cross section which is perpendicular to the first longitudinal cross section, the eye rinsing element decreases continuously.

Especially in a second end area in longitudinal direction, the eye rinsing element has at least one, preferably two, constant diameters. In this end area, the eye rinsing element can comprise at least one elevation to indicate a direction in which the eye rinsing element could be attached to a bottle comprising eye rinsing fluid. The elevation can be configured as an arrow. Typically, two elevations can be comprised in the second end area. The second end area is preferably configured as a cap-like portion and can comprise at least one opening, preferably only one opening, for letting rinsing fluid pass from a bottle comprising rinsing fluid to the inside of the eye rinsing element towards the discharge areas. The cap-like portion has preferably the shape of a cap or in other words lit.

The first longitudinal cross section preferably dissects both discharge areas, wherein the second cross section runs between the discharge areas. Especially the eye rinsing element in the second longitudinal cross section decreases consistently. In the respective cross section, the surfaces of the first end area are straight and enclose an angle between 20° and 60°, preferably between 30° and 50°, most preferred around 40°.

The eye rinsing element comprises a discharge channel in its inside guiding rinsing fluid to both discharge areas. Especially the discharge channel connects the opening in the second end area with the discharge areas. In particular, there is no separation separating the discharge channel into two different discharge channels, one for each discharge area inside the eye rinsing element, rather the rinsing fluid follows the geometry as described above and either ends up at one of the discharge areas.

Especially the eye rinsing element is configured as an attachment for an eye rinsing bottle of an eye rinsing device. The eye rinsing bottle preferably comprises eye rinsing fluid and can be squeezed for activating the discharge of eye rinsing fluid and thus an eye rinsing process.

The eye rinsing element can have two recesses which can each serve for hosting a nose of a user of the eye rinsing element. The two recesses are disposed on opposite sides of the element. The recesses are centered on a first plane of symmetry of the eye rinsing element, wherein the first plane of symmetry is disposed between the two discharge areas.

Especially the eye rinsing element has two planes of symmetry, such that each plane of symmetry cuts the eye rinsing elements into two mirrored halves, preferably except for the elevations in the second end area. The two planes of symmetry are perpendicular to each other, and both run in the longitudinal direction of the eye rinsing element. While the first plane of symmetry is disposed between the two discharge areas and comprises the first cross section, the second plane of symmetry runs through both discharge areas and comprises the second longitudinal cross section. In other words, the eye rinsing element has an inwardly curved configuration forming the recesses in a central part of both sides of the eye rinsing element, so that a user has two different possibilities to put the eye rinsing element to the middle of his nose.

In a further aspect, the invention relates to an eye rinsing device comprising an eye rinsing bottle and an eye rinsing element as described above.

BRIEF DESCRIPTION OF THE DRAWINGS

The invention will be described below with reference to the following figures which show in schematic representation.

PREFERRED EMBODIMENTS OF THE INVENTION

Figure 1:
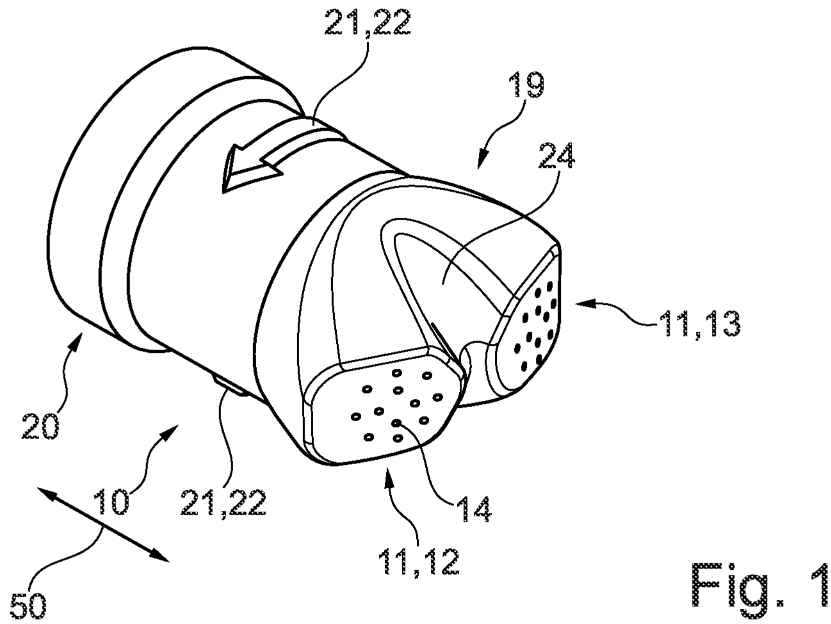
FIG. 1: a perspective view of an eye rinsing element.

FIG. 1 shows a perspective view of an eye rinsing element 10 according to the present invention. The eye rinsing element 10 has two rinsing fluid discharge areas 11, namely a first discharge area 12 as well as a second discharge area 13. Each discharge area 11 comprises multiple openings 14.

In a longitudinal direction 15 of the eye rinsing element 10, the eye rinsing element 10 has two end areas, namely a first end area 19, in which the discharge areas 11 are disposed, as well as a second end area 20 which is configured as a cap-like portion for being attached to an eye rinsing bottle comprising eye rinsing fluid. In the second end area 20, two elevations 21 in the form of an arrow 22 are disposed to indicate a direction to screw the eye rinsing element onto an eye rinsing bottle.

In FIG. 1 a recess 24 in the first end area 19 for hosting a nose of a user can clearly be seen, which extends towards the end of the eye rinsing element 10 in the first end area 19.

Figure 2:
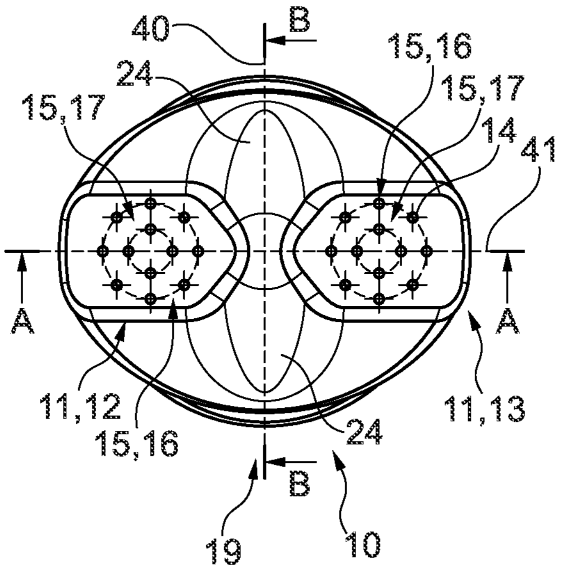
FIG. 2: a top view of a first end area of the eye rinsing element according to FIG. 1.

FIG. 2 shows a top view on the first end area 19 of the eye rinsing element 10 according to FIG. 1. Clearly the two discharge areas 11 can be seen comprising the openings 14. The openings 14 are disposed on two concentric circles 15, namely an outer circle 16 and an inner circle 17. While the inner circle 17 has four openings, the outer circle 16 has double as much, namely eight, openings 14. The eye rinsing element 10 has two planes of symmetry, namely a first plane 40 of symmetry and a second plane 41 of symmetry. Both planes of symmetry run in the longitudinal direction 15. Except for the elevation 21 in the second end area 20, the planes of symmetry divide the eye rinsing element 10 into two mirrored halves. The recesses 24 are centered on the first plane of symmetry 40.

The first plane of symmetry 40 runs between the two discharge areas 11, while the second plane of symmetry 41 runs through both of them. The two planes of symmetry are perpendicular to each other. Thus, in the top view seen in FIG. 2 the recesses 24 are formed in a middle portion towards the first plane 40 of symmetry allowing the nose of a user to be hosted into a recess so that the eye rinsing element 10 can be used in two different orientations.

Figure 3:
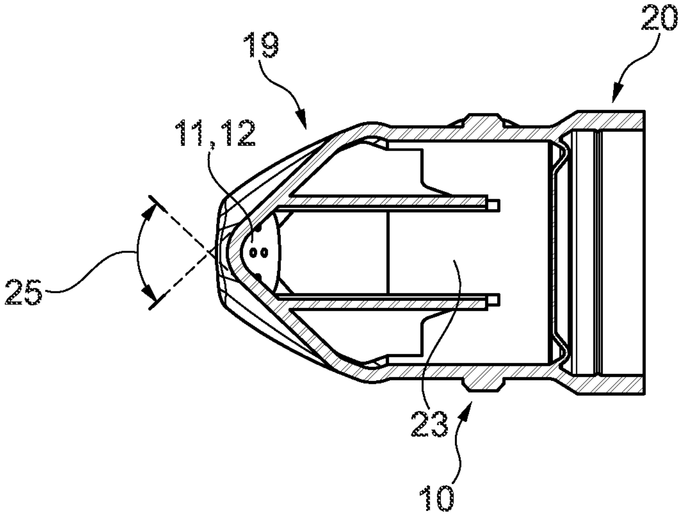
FIG. 3: a cross-sectional view along the section A-A of FIG. 2.

FIG. 3 shows a longitudinal cross-section along the lines A-A of FIG. 2. This longitudinal cross-section is the second longitudinal cross-section. The eye rinsing element 10 decreases in its first end area 19 starting from the second end area 20 to a free end of the eye rinsing element. The eye rinsing element 10 decreases continuously, while the surfaces enclose an angle 25 of roughly 40°. In the inside of the eye rinsing element 10, a discharge channel 23 is configured allowing rinsing fluid to either flow towards the first discharge area 12 or the second discharge area 13.

Figure 4:
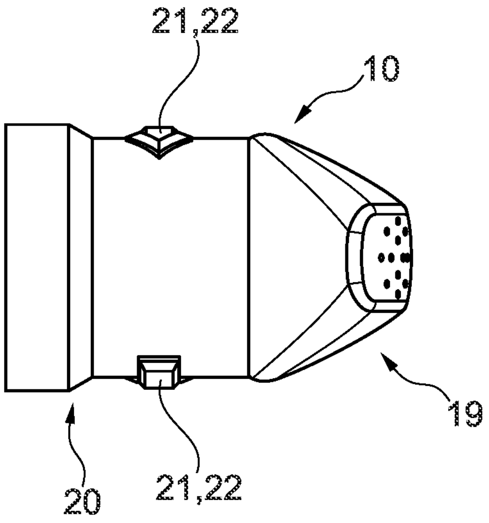
FIG. 4: a side view of the eye rinsing element according to the proceeding figures.

FIG. 4 shows a side view of the eye rinsing element 10 in which again the decrease of the eye rinsing element starting from the second end area 20 towards the discharge areas 11 is seen. In the second end area 20, the eye rinsing element has two constant diameters, one being larger at the free end of the eye rinsing element 10 in the second end area, wherein the elevation is disposed in the section with the smaller constant diameter.

Figure 5:
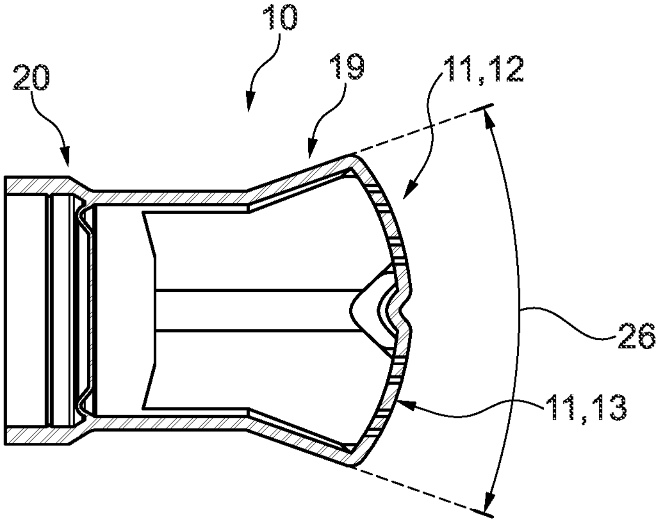
FIG. 5: a cross-sectional view along the lines B-B of FIG. 2.

In FIG. 5 a cross-section along the lines A-A of FIG. 2 is shown. This is the first longitudinal cross-section in which the eye rinsing element 10 within its first end area 19 widens continuously such that the surfaces of the eye rinsing element in the cross-section have an angle 26 to each other.

Figure 6:
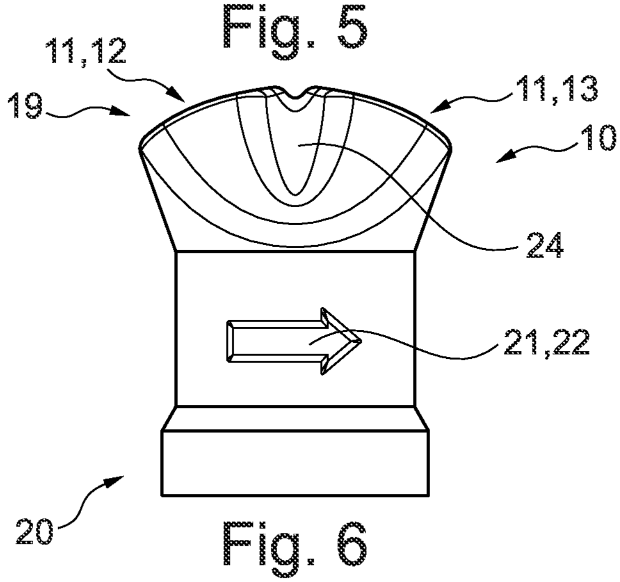
FIG. 6: another side view of the eye rinsing element.

FIG. 6 shows another side view of the eye rinsing element 10 with its first end area 19 and its second end area 20. Again, the discharge areas 11, the first discharge area 12 as well as the second discharge area 13, can be seen from the side. In between extending towards the middle there is the recess 24.

LIST OF REFERENCE SIGNS

10 eye rinsing element
11 discharge area
12 first discharge area
13 second discharge area
14 opening
15 concentric circle
16 outer circle
17 inner circle
18 curved surface
19 first end area
20 second end area
21 elevation
22 arrow

23 discharge channel
24 recess
25 first angle
26 second angle
40 first plane of symmetry
41 second plane of symmetry
50 longitudinal direction It is claimed:

1. An eye rinsing element, wherein the eye rinsing element comprises two rinsing fluid discharge areas, wherein each discharge area comprises at least 6 openings for discharging rinsing fluid and each discharge area covers an area of at least 1 $cm^2$, wherein the discharge areas form part of a curved surface which in a first longitudinal cross-section has a radius between 3 mm and 9 mm, wherein the eye rinsing element is configured as an attachment for an eye rinsing bottle of an eye rinsing device, wherein the eye rinsing element has two end areas, namely a first end area, in which the discharge areas are disposed, as well as a second end area which is configured as a cap-like portion for being attached to an eye rinsing bottle comprising eye rinsing fluid, wherein the eye rinsing element has a first end area in longitudinal direction comprising the rinsing fluid discharge areas, wherein in the first end area the eye rinsing element widens continuously in a first longitudinal cross-section, wherein in the first end area, the eye rinsing element decreases continuously in a second longitudinal cross-section, wherein the second longitudinal section is perpendicular to the first longitudinal cross-section.

2. The eye rinsing element according to claim 1, wherein the discharge areas each comprise at least 8 openings.

3. The eye rinsing element according to claim 1, wherein the openings are arranged on two concentric circles.

4. The eye rinsing element according to claim 3, wherein an outer circle comprises more openings than an inner circle.

5. The eye rinsing element according to claim 4,

Wherein the outer circle comprises at least double as many openings as the inner circle.

6. The eye rinsing element according to claim 4, wherein neighbouring openings of the inner circle have an angular distance of 90°, wherein neighbouring openings of the outer circle have an angular distance of 45°.

7. The eye rinsing element according to claim 1, wherein the openings are formed within the eye rinsing element parallel to each other and in a longitudinal direction of the eye rinsing element, so that rinsing fluid is discharged in both discharge areas in the longitudinal direction of the eye rinsing element.

8. The eye rinsing element according to claim 1, wherein the openings have a diameter between 0.1 mm and 5 mm.

9. The eye rinsing element according to claim 1, wherein the eye rinsing element comprises a discharge channel in its inside guiding rinsing fluid to both discharge areas.

10. The eye rinsing element according to claim 1, wherein the eye rinsing element has two recesses for a nose of a user of the eye rinsing element, said two recesses being disposed on opposite sides of the eye rinsing element, wherein the recesses are centred on a first plane of symmetry of the eye rinsing element, the first plane of symmetry being disposed between the two discharge areas.

* * * * *